UNITED STATES PATENT OFFICE.

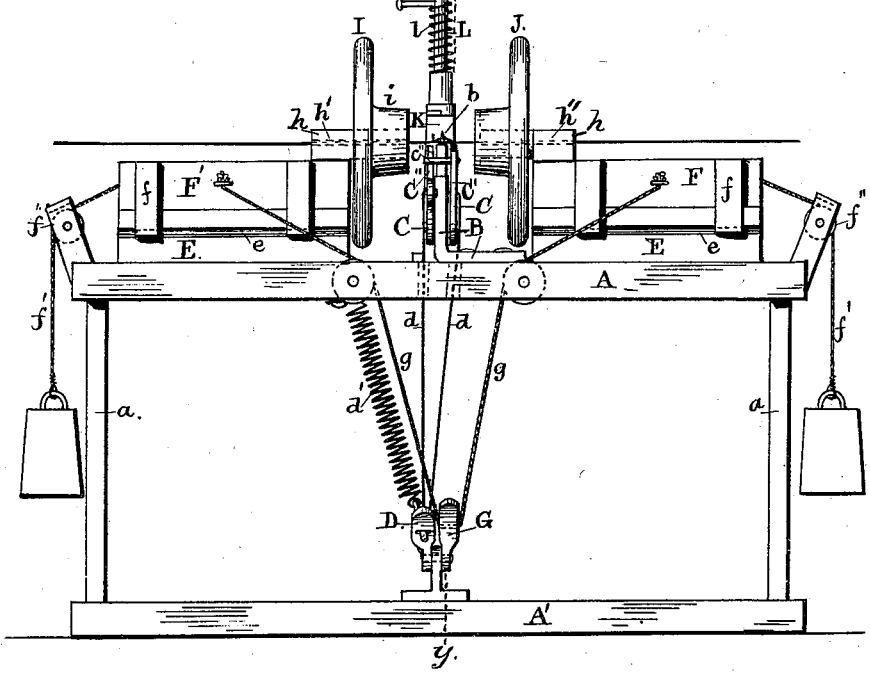

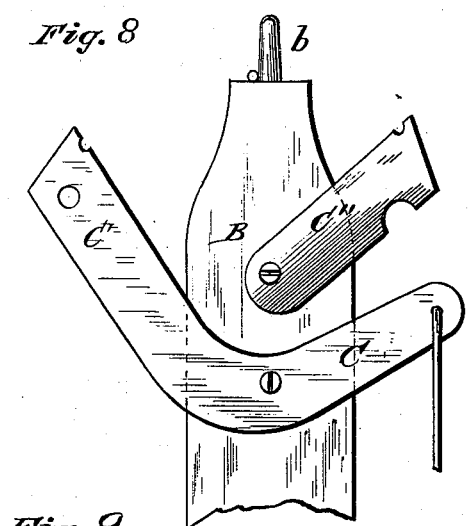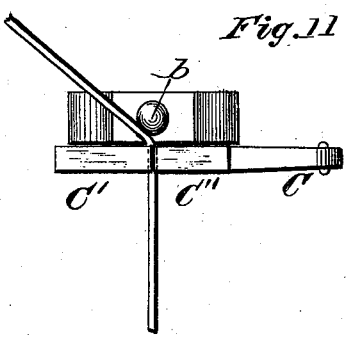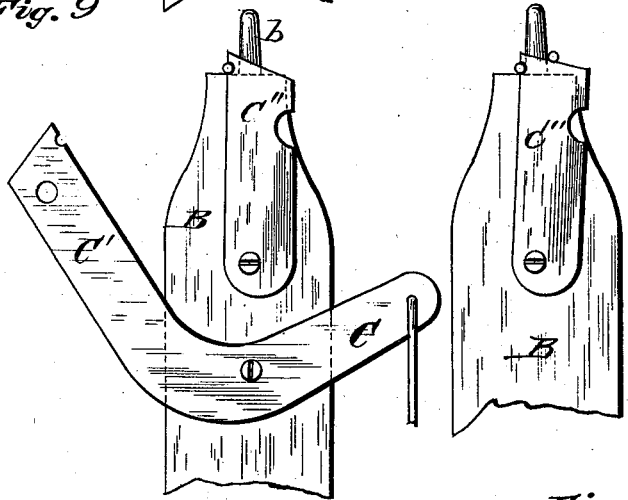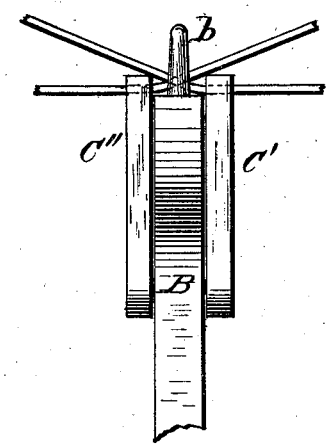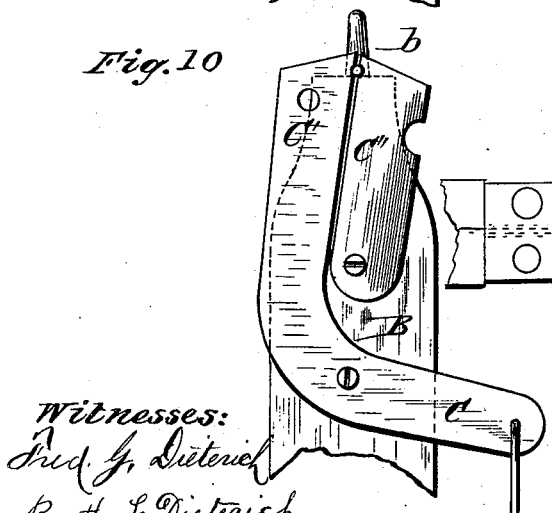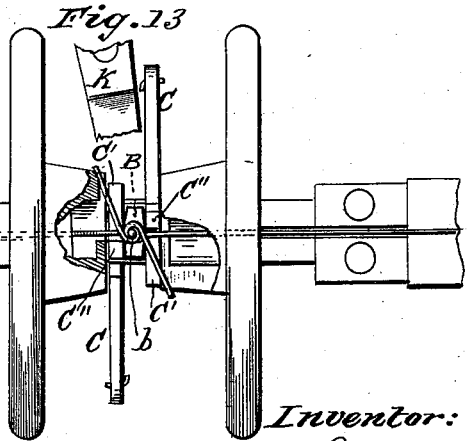

ALDEN BARNES, OF BLOOMINGTON, ILLINOIS.

MACHINE FOR FORMING INTERLOCKING EYES.

SPECIFICATION forming part of Letters Patent No. 230,604, dated August 3, 1880.

Application filed February 4, 1879.

*To all whom it may concern:*

Be it known that I, ALDEN BARNES, of Bloomington, in the county of McLean and State of Illinois, have invented certain new and useful Improvements in Machines for Forming Interlocking Eyes and Knots on Check-Row Chains for Corn-Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a side elevation of a machine embodying my invention. Fig. 2 is an elevation of the face side of one of the twister-wheels. Fig. 3 is a sectional view on the line $xx$ in Fig. 4, with the clamping-jaws closed. Fig. 4 is a sectional view in the line $yy$ in Fig. 1, showing an elevation of the clamping-jaws. Fig. 5 is a perspective view (bottom side) of the loop-former. Fig. 6 is an enlarged view of a completed knot. Fig. 7 is a detail view, hereinafter referred to; Fig. 8, an enlarged view, showing position of clamping-jaws before they are put on wire; Fig. 9, an enlarged view of one of the clamping-jaws as adjusted on wire; Fig. 10, an enlarged view, showing both clamping-jaws in closed position on wire; Fig. 11, an enlarged top view of Fig. 10; Fig. 12, side and front views, showing the position of the ends of the two wires when partially raised; Fig. 13, an enlarged top or plan view, with the horizontal twister and hubs of twisting-wheels broken away to show the position of the parts when ready for coiling the ends upon the main wires and forming the knots.

This invention has for its object to furnish a machine for uniting the sections and forming the knots on knotted check-row chains for corn-planters, such as, or similar to such as, shown in the Letters Patent reissued to me February 20, 1877, No. 7,522; and the invention consists, first, in the combination of a stud or pin with jaws which hold the adjacent ends of two sections of wire, one on each side of the pin, and with a grooved plate which may be rotated to form the interlocking eyes on the wire sections; second, in the use of twister-wheels having hubs so constructed as to hold the ends of the wires while the wheels are rotated to coil the ends upon the main wires and form the knots while the wire is held by the clamps hereinbefore mentioned.

The invention further relates to details of construction and combinations hereinafter fully described, and set forth in the claims hereto annexed.

Referring to the drawings by letters, A represents the upper, and A' the lower, bases, which support the working parts, and $a$ are standards supporting the upper base.

B is a standard projecting upward from the central part of the base A, and has a stud or pin, $b$, projecting from its upper surface. On each side of the standard B is pivoted, at $c$, a bell-crank lever, C, having a clamping-jaw, C', from each of which levers C a rod, $d$, extends downward to a treadle or lever, D, by means of which the jaws C' C' may be simultaneously drawn toward each other, and a spring, $d'$, is connected with the treadle or lever D for retracting it.

C'' C'' are jaws, one pivoted at each side of the standard B, so as to coact one with each jaw C', each jaw C' being provided with an arm, $c''$, which extends across the standard B behind the jaw C' on the opposite side of said standard, so that when the jaws C' are moved toward the wire the arms $c''$ will force the jaws C'' forward toward each jaw C'.

E E are blocks fixed on the base A, and F F' are blocks, one on each block E, and provided with guide-clamps $f$, which fit in grooves or ways $e$ in the blocks E and permit drawing the blocks F F' toward each other by means of a treadle or lever, G, and cords $g$. When the treadle or lever G is released the blocks F F' are retracted by weighted cords $f'$, which pass over pulleys $f''$.

H H' are journals secured, respectively, to the inner ends of the blocks F F' by heads $h$. The journal H and its head $h$ have a central hole (shown by dotted lines $h'$) for the passage of the wire, and the journal H' and its head $h$ have a longitudinal groove, $h''$, for the same purpose.

I is a wheel mounted on the journal H, and has a disk, $i$, on the inner end of its hub, with a V-shaped opening, $j$, cut in said disk, as shown at Fig. 2 of the drawings. J is a wheel similar to the wheel I, except that its hub has a V-shaped opening, $j'$, extending its full length.

K is a standard, curved so that its upper end is over the stud $b$ of the standard B, and is pierced for a vertically-sliding bolt, L, which is encircled by a retracting-spring, $l$, and provided with a handle, $l'$. On the lower end of the sliding bolt L is a head, M, with a central hole, $m$, which receives the stud $b$ when the bolt is forced down by pressure on its upper end, and with part of its lower face cut away, so as to leave projecting parts $m'$, as shown at Fig. 5 of the drawings.

In operation the wire is passed in, a section at a time, through the hub of the wheel I, and after the knot is formed is passed outward through the wheel J by lifting it out of the groove $j'$ in the hub of the wheel J.

To form the interlocking eyes on the ends of the wire sections of the chain the adjacent ends of two sections of wire are placed one on each side of the stud $b$, and each extending a short distance beyond the clamping-jaws C' C'', which are then adjusted on the wire and the treadle or lever D pressed downward to bring the jaws C' C'' to hold a wire on each side of the stud $b$, and the ends of the wire slightly turned upward by hand. The sliding bolt L may then be pressed downward until the stud $b$ enters the hole in its center, and the projections $m'$ are brought down, so that by turning the bolt L nearly or once around on its axis by the handle $l'$ the projections $m'$ will carry the ends of the wires around the stud $b$, and thus form an eye on each section, the eyes interlocking with each other, as shown by Fig. 7, which is an enlarged top view of the stud $b$, and the wires in the condition last described.

The bolt L is then released, and the spring $l$ raises it out of the way of the wheels I J, which are then brought up to the jaws C' C'', as clearly shown in Fig. 13, by pressure on the treadle or lever G, so that the ends of the wire will be received one into the V-shaped recess in the end of each hub of a wheel, I J, and the wheels I J may then be rotated in opposite directions to wind or coil each end of wire around that portion of itself next to the eye at its end and form a knot and joint, as shown at Fig. 6 of the drawings. The treadle and lever G being then released, the weighted cords $f'$ will retract the blocks F F', and the treadle or lever D being released, the spring $d'$ will open the jaws C C'', when the wire may be raised from the stud $b$ and passed outward through the wheel J until the end of the section reaches the stud $b$, when a new section may be inserted through the wheel I and the same operation repeated.

What I claim as new is—

1. The standard B and stud $b$, arranged to operate with the jaws, C' C'' and head M, having projections $m'$, to form interlocking eyes on the sections of a wire chain, substantially as shown and described.

2. The sliding bolt L, spring $l$, and standard K, in combination with the rotating head M, standard B, and stud $b$, substantially as described, and for the purpose specified.

3. The clamping-jaw C', having arm $c''$, and the jaw C'', arranged to operate with a standard, B, having a stud, $b$, in its upper end, so as to hold the wire sections while interlocking eyes are formed around the stud $b$, substantially as and for the purpose specified.

4. In combination with a stud, $b$, for holding the ends of the wire, a head, M, located above the stud $b$, which may be rotated to force the wire around the stud and form interlocking eyes thereon, as and for the purpose specified.

5. In combination with clamping-jaws for holding the wires, wheels I J, having their hubs adapted to hold the ends of the wire, while the wheels are rotated to wind the ends of the wires upon themselves to form knots, substantially as and for the purpose specified.

6. The sliding blocks F F' and wheels I J, in combination with standard B, stud $b$, and clamping-jaws C' C'', substantially as and for the purpose specified.

7. Treadle or lever G, cords $g$, and weighted cords $f'$, in combination with sliding blocks F F' and twister-wheels I J, substantially as and for the purpose set forth.

In testimony that I claim the foregoing as my own I affix my signature in presence of two witnesses.

ALDEN BARNES.

Witnesses:
JOSEPH W. FIFER,
ISAAC N. PHILLIPS.